Figure 1:
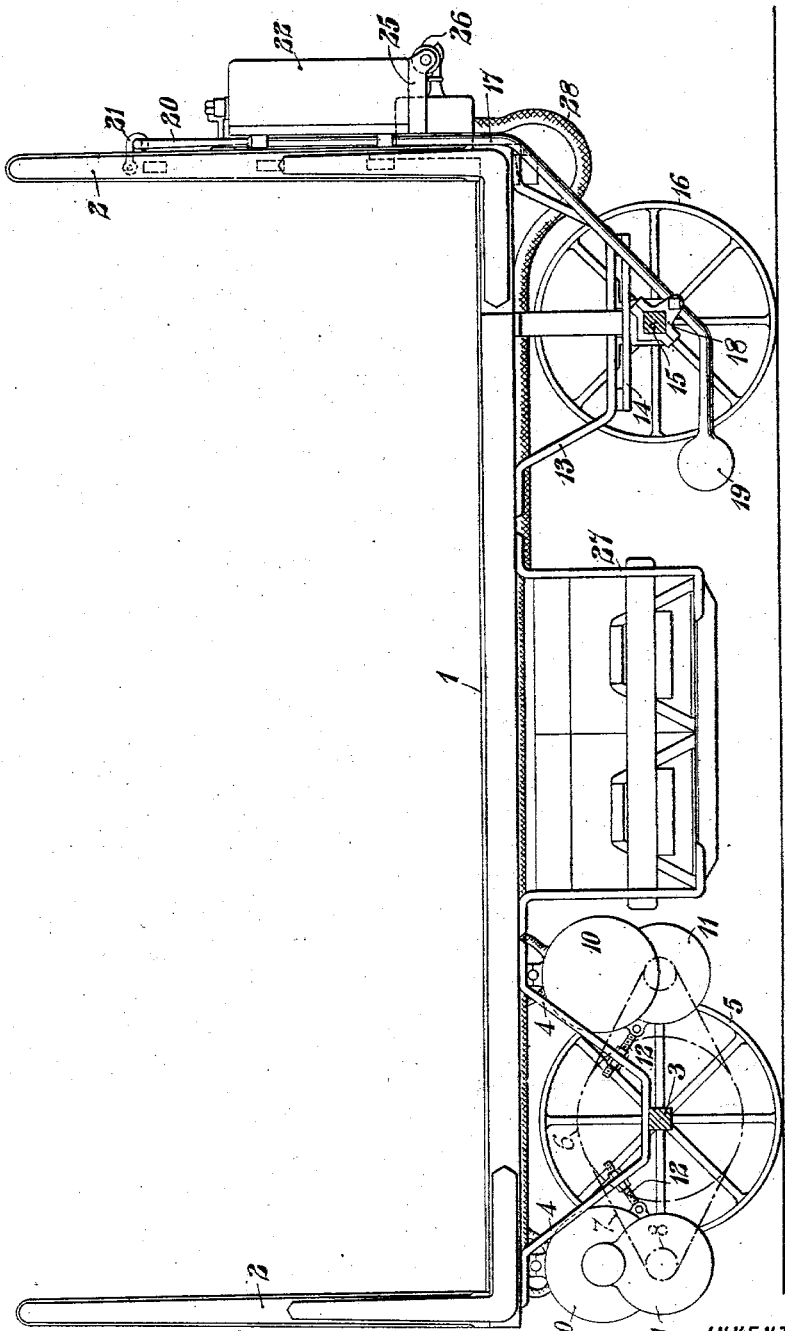

No. 753,284. PATENTED MAR. 1, 1904.
H. P. MAXIM.
ELECTRICALLY PROPELLED VEHICLE.
APPLICATION FILED APR. 4, 1903.
NO MODEL. 2 SHEETS—SHEET 2.

WITNESSES:
C. L. Belcher
J. E. Morse

INVENTOR
Hiram Percy Maxim
BY
Wesley G. Carr
ATTORNEY.

No. 753,284.

Patented March 1, 1904.

UNITED STATES PATENT OFFICE.

HIRAM PERCY MAXIM, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRICALLY-PROPELLED VEHICLE.

SPECIFICATION forming part of Letters Patent No. 753,284, dated March 1, 1904.

Application filed April 4, 1903. Serial No. 151,200. (No model.)

*To all whom it may concern:*

Be it known that I, HIRAM PERCY MAXIM, a citizen of the United States, and a resident of Pittsburg, in the county of Allegheny and State of Pennsylvania, have invented a new and useful Improvement in Electrically-Propelled Vehicles, of which the following is a specification.

My invention relates to electrically-propelled vehicles; and it has for its object to provide an equipment for vehicles of this character whereby the direction and speed of the vehicle may be conveniently controlled by an attendant or operator while walking either behind or in front of the same and whereby the vehicle can be operated only when the attendant is on foot and in position to properly guide the same.

As illustrated in the drawings, my invention is shown as applied to a baggage-truck, and it will be mainly useful in connection with such a vehicle, though not restricted to any specific form of vehicle-body or to any particular service.

Figure 2:
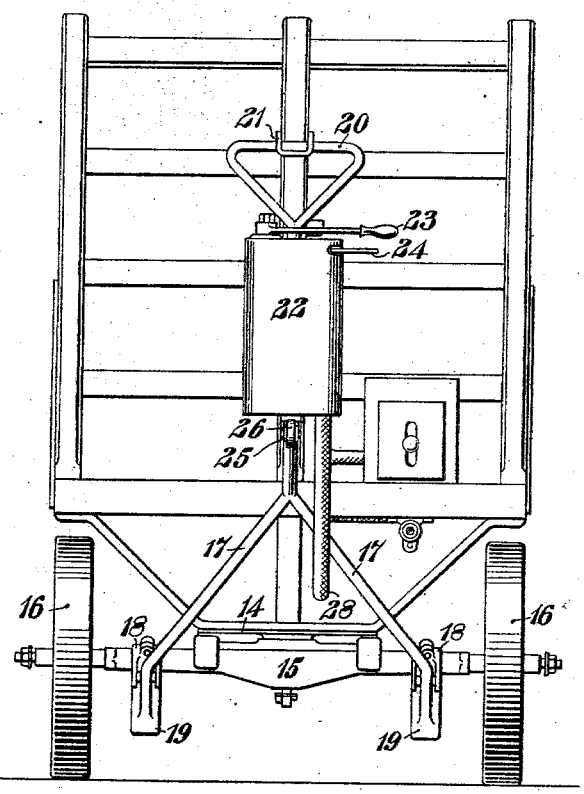
Figure 3:
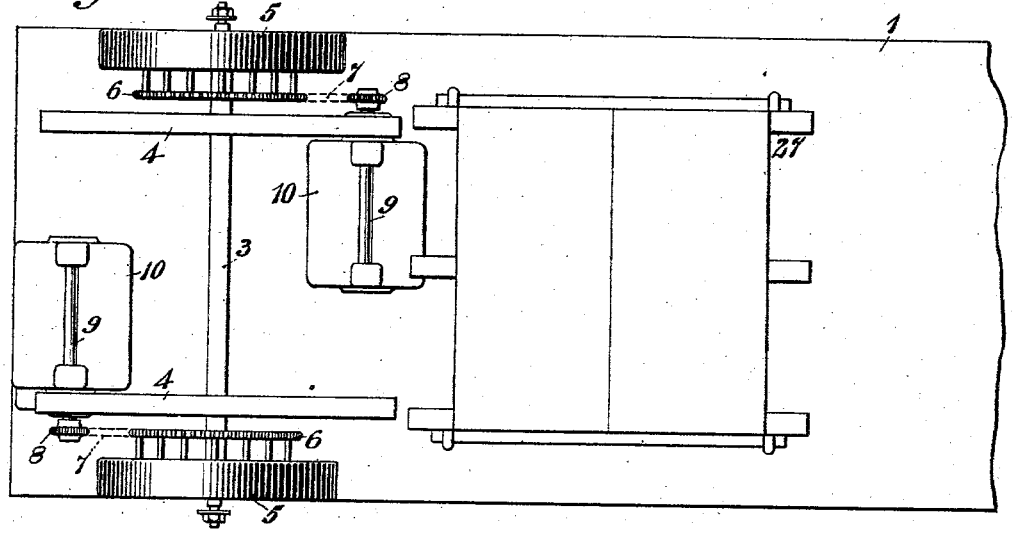

In the drawings, Figure 1 is a side elevation of a baggage-truck equipped with my invention, the axis of the truck being shown in section. Fig. 2 is an end elevation of the truck shown in Fig. 1, and Fig. 3 is a bottom plan view of the upper portion of the truck shown in the other figures.

The body of the vehicle is here shown as of ordinary form having a horizontal base or platform 1, and two substantially vertical ends 2 and without sides. The body is mounted at one end upon an axle 3 by means of supporting-irons 4, the main portion of the axle being squared and the ends being turned to a cylindrical or tapered form, as is usual, to receive supporting and driving wheels 5. Rigidly connected to these wheels 5 are sprocket-wheels 6, which are connected by sprocket-chain 7 to sprocket-pinions 8 upon the ends of shafts 9, which are in turn geared to the shafts of electric motors 10, the gearing being employed in order to secure a reduced speed from the motor-shafts and being inclosed in gear-cases 11 in the usual manner.

The motors 10 are mounted at opposite sides of the shaft 3 and are respectively geared to the corresponding driving-wheels 5, as above specified, this staggered arrangement of the motors being provided in order to permit of the employment of motors of the necessary size within the comparatively small space that is provided between the power-transmitting gears. The motors and gear-cases are suspended from the base 1 of the truck-body and are also connected to the irons 4 by means of bolts and nuts 12, the latter having a hinge or pivot connection with the motor and gear casings and permitting of the adjustment of the positions of the casings in order to increase or decrease the slack of the sprocket-chains, and thus take up any wear which may occur. The other end of the truck-body is supported by means of irons 13 upon a wheel or disk 14, which is in turn mounted upon the axle 15 of two supporting and steering wheels 16, the relation between the wheel or disk 14 and the axle being such as to permit the axle to be turned freely in a horizontal direction with reference to the truck-body and the driving-wheels.

A bifurcated steering-lever 17 has its two arms pivotally attached to collars 18, which are clamped upon the squared portion of the shaft 15, and each of these arms projects beyond the pivotal connection beneath the truck-body and is provided with a counterweight 19. The unbifurcated portion of the steering-lever is provided with a handle 20, which is engaged by a hook or latch 21 when moved into the position shown in the drawings in order to hold it in that position when it is not in use for steering purposes.

Rigidly clamped to the undivided portion of the steering-lever is a controller 22, which may be of suitable internal construction to permit of such circuit variations of the motors and the batteries supplying the same with energy as will start the vehicle and vary its speed in accordance with the usual practice. The controller is provided with a handle 23 for so adjusting its movable member as to vary the power and speed of the motors in the usual manner and with a handle 24 for operating a reversing-switch. (Not shown.)

At such times as the steering-lever 17 may be permitted to lie in its lowermost position the controller will be prevented from coming into contact with the flooring or ground by an arm or bracket 25, having a roller 26, which together serve as the supporting means, thus insuring protection to the controller in case the lever 17 is let down more violently than is intended.

The batteries for supplying the motors with energy are mounted in a frame 27, which is supported from the truck-body between the two sets of wheels, and the current is conveyed between the battery, motors, and controller by means of suitable insulated cables 28. It will be seen that when the vehicle is in use the handle 20 will be released by raising the hook or latch 21 out of engagement therewith and the lever and controller lowered into convenient position to enable the user to steer the vehicle by means of the lever and that at the same time the controller, which is supported directly upon the lever, is in a convenient position to permit the user to manipulate a reversing-switch and the main handle of the controller, so as to readily start the vehicle in either direction, vary its speed, and stop it at the same time that he is manually controlling the direction of its movement by turning the steering-lever to one side or the other.

By means of this combination of apparatus a single operator may move as heavy a load as the truck will bear from place to place without difficulty, whereas if manual propulsion were depended upon several men would be required to do the work.

A further advantage incident to the construction here shown resides in the fact that the truck may be employed for the movement of baggage, express matter, &c., without substantial danger of injury to pedestrians, it being possible to electrically propel the truck only when the steering-lever and the attached controller are lowered and under direct control of an attendant who is on foot and in position to properly guide the truck and regulate its speed.

The details of construction may obviously be varied from what is shown and described without departing from the invention, and I therefore desire it to be understood that the invention is not restricted to such details except in so far as limitations may be imposed by the state of the art.

I claim as my invention—

1. A self-propelled vehicle having a pair of driving-wheels and their axle, in combination with a pair of electric motors suspended from the vehicle-body at opposite sides and adjacent to opposite ends of said axle and gearing between each of said motors and the corresponding wheel, said wheels, motors and gear members being movable on horizontal axes only.

2. A baggage-truck having a pair of driving-wheels and an axle therefor, in combination with a pair of motors respectively suspended from the truck-body at opposite sides of the axle and adjacent to the driving-wheels and gearing between each motor and the corresponding wheel, said wheels, motors and gear members being movable on horizontal axes only.

3. The combination with a vehicle-body, a pair of driving-wheels and a pair of steering-wheels, of one or more electric motors geared to the driving-wheels, a steering-lever and a motor-controller mounted upon said steering-lever.

4. In a self-propelled vehicle, the combination with one or more propelling-motors, of a steering-lever and a motor-controller attached to and movable with said steering-lever.

5. In a self-propelled vehicle, the combination with a body and two pairs of supporting-wheels, of one or more electric motors geared to one pair of said wheels, a steering-lever connected to the axle of the other pair of wheels and a motor-controller supported by and movable with said steering-lever.

6. In a self-propelled vehicle, the combination with a pair of wheels and one or more electric motors geared thereto, of a pair of steering-wheels, a steering-lever having a hinge connection with the axle of said steering-wheels and a motor-controller mounted upon said lever and movable with it.

7. A self-propelled vehicle comprising a body, driving-wheels, one or more motors geared to said wheels, steering-wheels, a steering-lever hinged to the axle of said steering-wheels and having a counterweight and a motor-controller attached to said lever and movable with it.

8. A baggage-truck comprising a body, propelling and steering wheels, electric motors geared to the driving-wheels, a steering-lever hinged to the axle of the steering-wheels and provided with a counterweight, a motor-controller mounted upon said lever and a latch for fastening the lever to the truck-body.

9. The combination with a truck-body and two pairs of wheels and their axles, of one or more motors geared to one of said pairs of wheels, a counterweighted steering-lever hinged to the other axle and a motor-controller supported upon said steering-lever.

10. The combination with a truck-body, a pair of wheels at one end and a pair of electric motors geared thereto, of a pair of steering-wheels at the other end, a steering-lever hinged to the axle of said steering-wheels and provided with a counterweight and a motor-controller supported by said steering-lever.

11. In a baggage-truck, the combination with a body having upright ends, one of which is provided with a hook or latch, of two axles provided with supporting-wheels and one of which is mounted to turn upon a vertical axis, one or more electric motors geared to one pair of wheels, a counterweighted steering-lever hinged to the other axle and a motor-controller mounted upon said lever.

12. In a self-propelled vehicle, the combination with the vehicle-body, a pair of driving-wheels and a pair of steering-wheels, of one or more motors geared to the driving-wheels, a steering-lever hinged to the axle of the steering-wheels and located wholly outside the vehicle-body and a motor-controller mounted on said lever whereby the operation of the vehicle is controllable only by a pedestrian.

13. The combination with a vehicle-body having driving and steering wheels and axles therefor, of one or more motors geared to the driving-wheels, a steering-lever attached to the axle of the steering-wheels and located entirely outside the vehicle-body and a motor-controller mounted upon the steering-lever.

14. The combination with a vehicle-body having driving and steering wheels and axles therefor, of one or more motors geared to the driving-wheels, a steering-lever hinged to the axle of the steering-wheels and located entirely outside the vehicle-body, a motor-controller mounted on said lever and means for fastening said lever and controller to the vehicle-body when not in use.

In testimony whereof I have hereunto subscribed my name this 23d day of March, 1903.

HIRAM PERCY MAXIM.

Witnesses:
F. D. HALLOCK,
JAMES B. YOUNG.